Feb. 6, 1951 N. FELICI 2,540,327
ELECTROSTATIC MACHINE
Filed Jan. 5, 1949 3 Sheets-Sheet 1

INVENTOR
Noel Felici
By George H. Corey
ATTORNEY

Feb. 6, 1951    N. FELICI    2,540,327
ELECTROSTATIC MACHINE
Filed Jan. 5, 1949    3 Sheets-Sheet 2

INVENTOR
Noel Felici
By George Hadley
ATTORNEY

Feb. 6, 1951 — N. FELICI — 2,540,327
ELECTROSTATIC MACHINE
Filed Jan. 5, 1949 — 3 Sheets-Sheet 3

INVENTOR
Noel Felici
BY George H. Corey
ATTORNEY

Patented Feb. 6, 1951

2,540,327

UNITED STATES PATENT OFFICE 2,540,327

ELECTROSTATIC MACHINE

Noel Felici, Grenoble, France, assignor to Centre National de la Recherche Scientifique, Paris, France, a corporation of France Application January 5, 1949, Serial No. 69,360
In France January 16, 1948

14 Claims. (Cl. 171—329)

This invention relates to electrostatic generating machines and motors of the type comprising conductive relatively movable electrostatic inductor and carrier members or electrodes and more particularly to means for improving such generating machines and motors so as to obtain or to utilize a current of substantially steady intensity.

In conventional machines of this type the electrical energy ordinarily is delivered in a discontinuous or intermittent manner to the load circuit by the conductive movable electrodes or carriers so that the intensity or the current flowing in the load circuit is not steady but undergoes a periodic variation the period of which is equal to the duration of the operation cycle of the machine.

These variations of the current intensity are particularly pronounced in electrostatic machines in which the carriers are formed of wide conductive surfaces, as in the Toepler type machines.

Such conventional electrostatic machines are unsuitable or disadvantageous for supplying certain types of apparatus, such as X-ray tubes, electronic microscopes and the like, in which it is important that the fluctuations of the voltage and hence of the current be less than a well defined limit.

It is possible to reduce the fluctuations of the current and voltage by connecting across the terminals of the machine, in a known manner, a condenser having a sufficient capacity. But this method offers drawbacks resulting from the cost, weight and size of such condensers and from the risk of their accidental discharge inside the machine which may cause considerable damage due to the large amount of the charge which the condenser carries. In order to overcome these various drawbacks endeavor has been made heretofore to provide steady current electrostatic machines with conductive moving parts, i. e. machines in which the output current, even in the absence of a filtering condenser, has a constant intensity or is only subjected to variations small enough to be practically neglected.

The invention essentially consists in so arranging the machine parts that at least two current collectors or output brushes are connected in parallel to an output terminal and collect in succession the charges carried by at least two carrier members as respectively they move out of inductive relation to inductor members associated therewith. This arrangement is such that there is always at least one brush collecting a charge without an idle period during which no carrier is connected to the output brush and terminal which would cause the delivery of the current to the outside circuit to be stopped. More generally speaking the variations of the current delivered to each brush as a function of time are such that the current resulting from the superposition of the partial currents delivered to the various parallelly connected brushes, that is in succession from the two carrier members, not only is never zero but with a suitable number of sets of carrier and inductor members may be subject to fluctuations so small as to be practically negligible.

In accordance with the invention the carrier members are continuously insulated from the inductor members and the carrier members of the different sets are so related to each other with respect to the time of their connection to the output brushes and as to their positions relative to the inductor members that at the time of such connection each carrier member has moved out of registering inductive relation to the inductor member with which it is associated and the potential of such carrier member has increased to or approached the desired output potential, that is the potential of the output brush and terminal. As the carrier also is insulated from the output brush and terminal during a substantial part of its movement out of registering inductive relation to the associated inductor member prior to connection to the output brush, the full electrostatic charge produced upon the carrier in its registering position with respect to the inductor is available at a predetermined potential for delivery to the load circuit and this delivery continues after such connection by virtue of the continuous change in the inductive relation of the carrier and inductor until the carrier is disconnected from the output brush and terminal.

In order to maintain the continuity of charge delivery and current flow to the load circuit the arrangement of the sets of inductor and carrier members in relation to each other with respect to the direction of movement of the carrier members out of inductive relation to the inductor members is such that as each carrier is about to be disconnected from the collecting brush and terminal, or somewhat before such disconnection, a second carrier at the desired attained potential is connected to this brush and terminal.

Various embodiments of the invention are described hereafter by way of examples, with reference to the accompanying drawings, in which.

Figure 1:
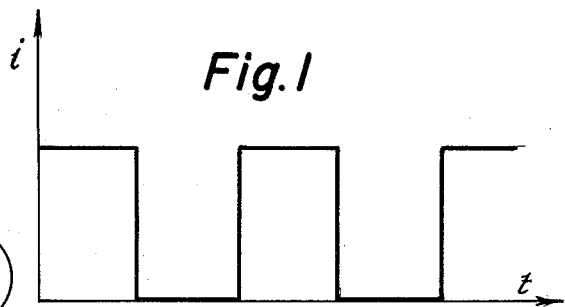
Figs. 1 and 2 are diagrams representing the variation of the intensity of currents which may be superposed according to the invention.

A constant intensity of the current in the outside circuit may be obtained by superposing two currents varying as a function of time according to the right angle curve of Fig. 1, these two currents being offset with respect to each other so that one is at its maximum value while the other is at its minimum value.

A current varying as shown at Fig. 1 is obtained when the capacities between inductors and transporters vary in relation to time while the potentials of the inductors are maintained at a constant value. Such conditions are frequently met in electrostatic machines, particularly of the Toepler type.

Many modifications may of course be imagined. Instead of two brushes each of which delivers current during one half of the time, three brushes delivering current during one third or two thirds of the time may be provided or, generally speaking, $m$ brushes delivering current during $n/m$ of the time; $n$ being any integer. In such case when each brush delivers a current of the square tooth characteristic of Fig. 1 and having an intensity of $I_0$, the whole assembly of brushes delivers a steady current having an intensity of $nI_0$.

Figure 2:
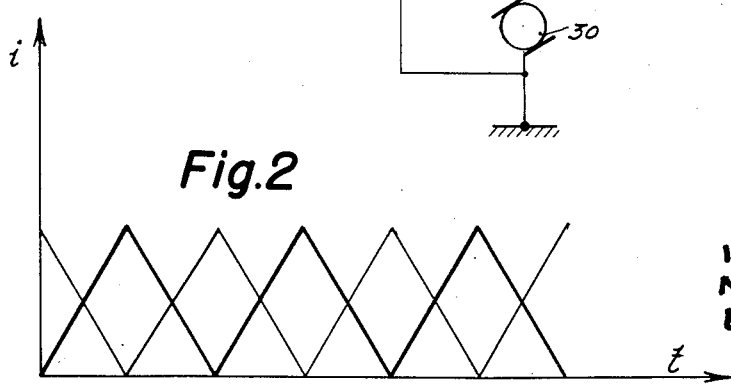

A constant current may also be obtained through superposing two or more currents the variation curves of which have any complementary shapes for instance, as shown in Fig. 2, triangular saw-toothed shapes, the intensities and relative phases of said currents being such that their total may be substantially constant.

Figure 3:
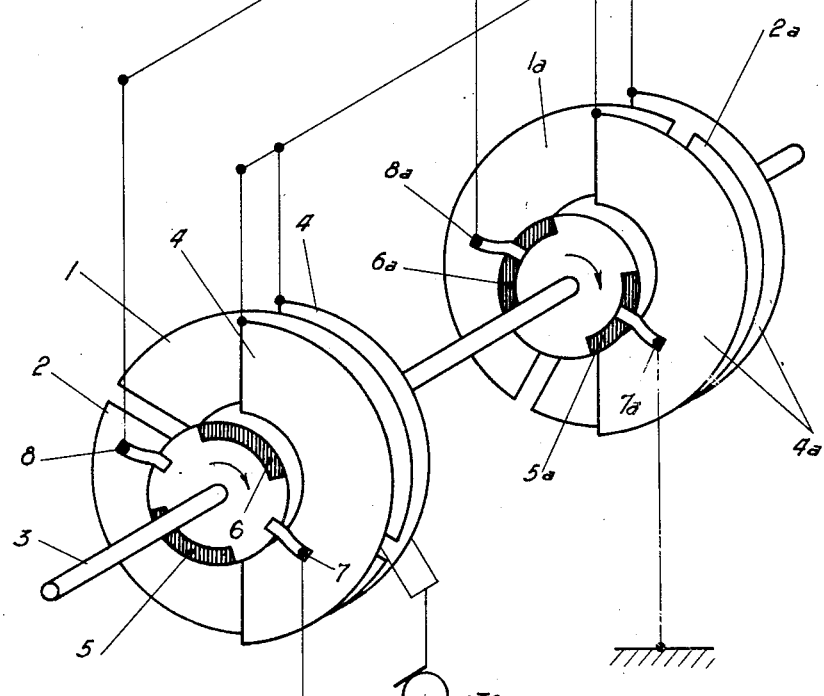
Fig. 3 is a diagrammatic perspective view of a Toepler type machine with two rotors carrying carrier members respectively associated with inductor members according to the invention.

Referring now to Fig. 3, a Toepler type machine according to the invention may comprise two separate rotors each of which is formed of two semi-circular carrier members 1, 2, 1a, 2a, mounted on a shaft 3 and insulated from each other and from the shaft. Each of these carrier members is electrically influenced by a particular inductor, viz. inductor 4 for rotor 1, 2 and inductor 4a for rotor 1a, 2a. The carrier members are electrically connected to contact members or sectors 5, 6 and 5a, 6a respectively, these sectors having an arcuate extent of 90° and with which cooperate, on the one hand, two grounded brushes 7, 7a and, on the other hand, two output brushes 8, 8a electrically connected together and to a sphere 9 which forms the output terminal or pole of the machine. The two rotors are angularly displaced by 90° with respect to each other about the shaft 3 so that when one of the output brushes, such as 8, leaves one of the contact members 5 or 6, the other output brush 8a immediately comes into contact with one of the contact members 6a or 5a. Thus, there is always a brush which is delivering current without overlapping and without interruption in this embodiment.

In order that the current may be perfectly steady, the instantaneous intensity during the delivery must be steady, which requires that the inductors be kept at a fixed potential. This is easily obtained, as shown, by connecting inductors 4 to a D. C. generator 30 and electrically interconnecting these inductors with inductors 4a, which substantially nullifies the fluctuations of the overall potential.

Figure 4:
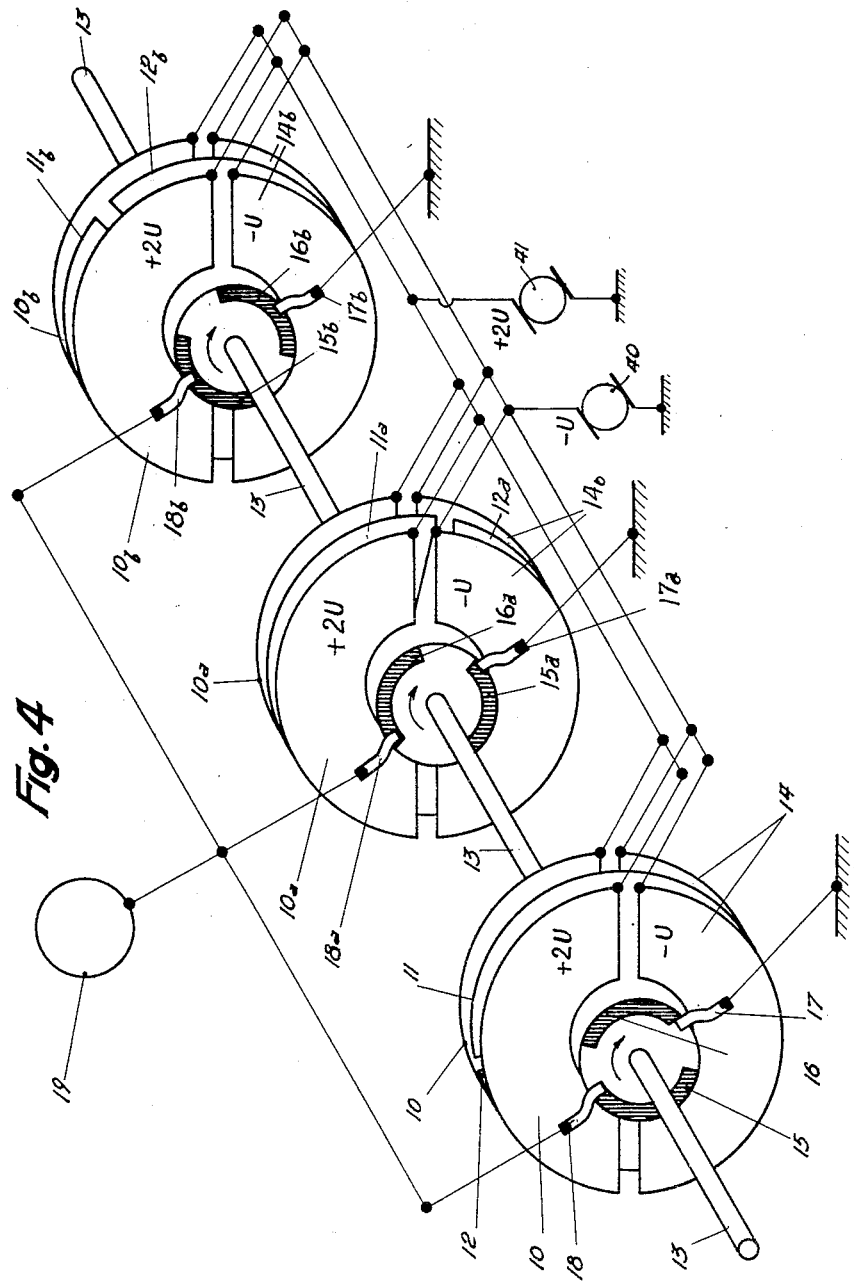
Fig. 4 is a similar view of a three-rotor machine with three sets of carrier and inductor members.

In the embodiment shown in Fig. 4, a Toepler type machine comprises three separate rotors each of which is formed of two semi-circular carriers 11, 12; 11a, 12a and 11b, 12b mounted on shaft 13 and insulated therefrom. Each of these carriers is electrically influenced in succession by two inductors 14, 10; 14a, 10a and 14b, 10b respectively, each inductor comprising two parallel inductor members or plates. Inductors 14, 14a and 14b are all parallelly connected to a D. C. generator 40 which brings them to a fixed potential, $-U$ for instance, $2U$ being the maximum difference of potential which may exist without discharge between the plates of the machine, and inductors 10, 10a and 10b are connected to another D. C. generator 41 which bring them to a fixed potential, for intance $+2U$ in this assumed case, this provision of two inductors for each rotor making it possible, as proposed in my copending application Serial No. 723,729, filed January 23, 1947, now Patent No. 2,519,554, issued August 22, 1950, to double the power of the machine. The carrier members of each rotor are electrically connected to contact members or sectors 15, 16; 15a, 16a and 15b, 16b respectively, each having an arcuate extent of 120° and with which cooperate, on the one hand, three grounded brushes 17, 17a and 17b and, on the other hand, three output brushes 18, 18a and 18b connected together and to a sphere 19 which forms the output terminal or pole of the machine. The three rotors are angularly displaced by 120° with respect to each other about the shaft 13 so that when one of the output brushes, such as 18, leaves one of the contact members or sectors 15 or 16, another brush, such as 18a, immediately comes into contact with one of contact members or sectors 16a or 15a. Similarly, when brush 18a is leaving sector 16a or 15a upon further rotation of the shaft, brush 18b makes contact with sector 16b or 15b. Thus, there are always two brushes delivering current simultaneously and not more nor less in this embodiment.

Figure 5:
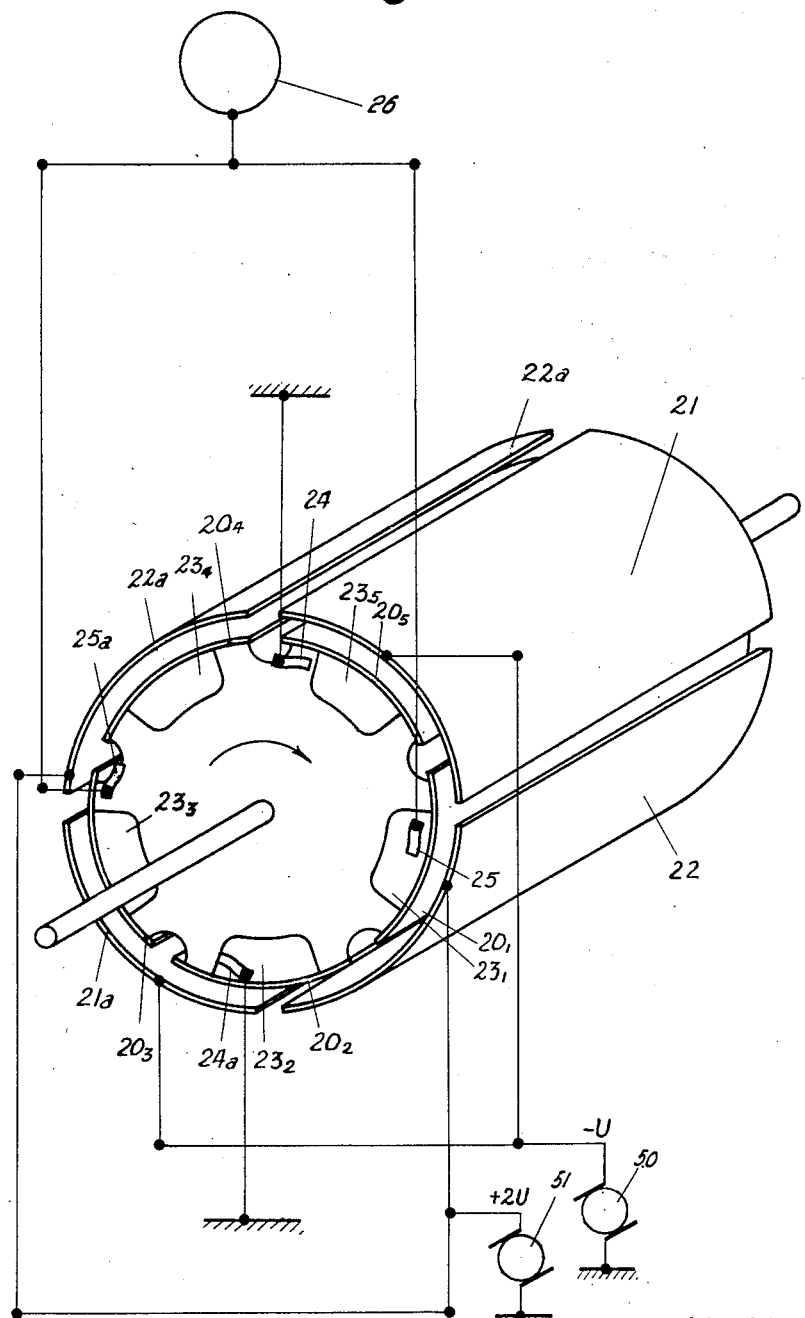
Fig. 5 is a perspective view of another embodiment of the invention in a cylindrical single rotor machine.

Figure 5 shows a cylindrically arranged Toepler type machine comprising one rotor only carrying five carrier members $20_1, 20_2, 20_3, 20_4, 20_5$ insulated from each other and formed of conductive cylindrical segments each having an arcuate extent of about 70°, two fixed inductors 21, 21a and two auxiliary inductors of screens 22, 22a each of which is formed of a conductive cylindrical segment having an arcuate extent of about 90°, the two inductors and the two screens being connected respectively to D. C. generators 50 and 51, to maintain the same conditions as set forth hereinabove in relation with the inductors of the machine of Fig. 4, namely that inductors 21, 21a are maintained at a potential, for example $-U$ and inductors 22, 22a are maintained at a potential $+2U$. For the respective carrier members the rotor carries contact members or sectors $23_1, 23_2, 23_3, 23_4,$ and $23_5$ respectively connected thereto and having an arcuate extent of about 36°. With these sectors cooperate, on the one hand, two grounded brushes 24, 24a and, on the other hand, two output brushes 25, 25a electrically connected to a sphere 26 which forms the output terminal or pole of the machine. The contact points of the four brushes 24, 25, 24a and 25a are set respectively at the four apexes of a square having its center upon the axis of the rotor. When brush 25 leaves contact member $23_1$, brush 25a comes at once into contact with contact member $23_3$, the rotor being assumed to rotate clockwise in Fig. 5, as shown by the arrow. As shown in the figure, brush 24 has just left sector $23_5$ and brush 24a has just engaged sector $23_2$. This concomitant connection and disconnection of the brushes and sectors takes place so that there is always one and only one carrier connected with the sphere 26 at a time. These carrier members thus deliver a current having a steady instantaneous intensity during the delivery, if the potentials of the inductors 21 and 21a, on the one hand, and of the screens 22, 22a, on the other hand, are sufficiently steady. This steadiness is suitably ensured by the interconnection of the inductors, on the one hand, and of the screens, on the other hand, especially when the capacity of each set with respect to ground is considerable.

The invention provides electrostatic machines the current of which does not vary by more than 1% during one operation period so that without the help of any filtering condenser it is possible to obtain a current steadiness sufficient for most uses.

By means of condensers of very small capacity which may be constituted in many cases by the natural capacities of the parts of the machine and receiver or load, it is possible to reduce the relative current fluctuations down to less than $\frac{1}{1000}$ and even $\frac{1}{10000}$.

It is also possible to make the current absolutely steady by compensating its residual irregularities by means of a compensating device not shown in the accompanying drawings, formed of a variable condenser the moving plates or rotor of which are fast with the shaft of the machine and electrically connected to the ground, while its insulated fixed plates or stator are electrically connected to the output pole or terminal of the machine. It is always possible to select the shape of this condenser so that it delivers the additional current required for steadying the current of the machine when it is slightly too weak and to draw the excess current when that of the machine is slightly too strong. The substantially constant current generated by the machine of the invention makes it possible to give to the compensating device cooperating therewith a very compact volume with respect to that of the machine proper.

The invention has been described as applied to electrostatic generators but, as above stated, it may also be applied to electrostatic motors with conductive carriers, particularly of the Toepler type. It makes it possible to build electrostatic motors drawing a steady current which is very advantageous with regard to the required capacities of generators and transmission lines supplying the motors as soon as the power becomes considerable. These machines provide a driving torque far more uniform than conventional electrostatic machines and may start automatically in every position of their rotor, since there is always at least one carrier connected to the feeding line.

What I claim is:

1. An electrostatic machine comprising at least two inductor members, conductive carrier members respectively associated with said inductor members, said inductor members and said carrier members being in insulated relation to each other and arranged for relative movement between the inductor members and the carrier members respectively associated therewith into and out of inductive relation to each other, a pair of brushes associated with each carrier member, given brushes of the respective pairs being electrically connected together, the other brushes of said pairs being electrically connected together, and means cooperating with the respective carrier members for establishing electrical connection of one of said carrier members to a selected brush associated therewith substantially when connection of a brush associated with another carrier member and connected to said selected brush is disestablished.

2. An electrostatic machine comprising at least two stationary conductive inductor members, conductive carrier members respectively associated with said inductor members and supported in insulated relation to each other and to said inductor members and for movement thereof into and out of inductive relation to the respective inductor members, a pair of brushes associated with each carrier member, given brushes of the respective pairs being electrically connected together and to an output terminal of the machine, the other brushes of said pairs being electrically connected together, means for maintaining said inductor members at a potential in a predetermined relation to the desired output potential of the machine, means for establishing electrical connection of said carrier members respectively to said given brushes concomitantly with movement of said carrier members out of inductive relation to the inductor members respectively associated therewith and for disestablishing said connections concomitantly with movement of said carrier members into said inductive relation to said inductor members, and means cooperating with said carrier members for establishing said electrical connection of one of said carrier members to a selected brush associated therewith substantially when connection of another carrier member to the brush associated therewith and electrically connected to said selected brush is disestablished.

3. An electrostatic machine comprising a rotatable shaft, a plurality of rotors carried upon said shaft for rotation therewith, each rotor carrying a plurality of conductive carrier members insulated from each other and arranged in spaced relation about the axis of a said shaft, conductive inductor members respectively associated with said rotors and said carrier members thereof in continuously insulated relation to said carrier members and arranged for movement of said carrier members into and out of inductive relation to the respective inductor members upon rotation of said shaft, conductive sectors carried by each rotor insulated from each other and respectively electrically connected to the carrier members of said rotor, a pair of brushes cooperating with said sectors of each rotor to establish and disestablish electrical connection of each carrier member of said rotor in succession to said brushes during rotation of said shaft, a pair of terminals of said machine, a given brush associated with each rotor being electrically connected to a given terminal of the machine and the other brushes being electrically connected to the other terminal of the machine, said rotors being arranged in relation to each other upon said shaft so that when a carrier member of a given rotor is in registering inductive relation to the inductor member associated therewith a carrier member of another rotor is out of registering inductive relation to the inductor member associated therewith in a predetermined angularly spaced relation about the axis of said shaft to said inductor member associated therewith, said conductive sectors of the respective rotors having an arcuate extent about the axis of said shaft substantially corresponding to said predetermined angular spacing of said carrier member of said other rotor in relation to said inductor member associated therewith.

4. An electrostatic machine as defined in claim 3 in which said rotors are carried upon said shaft so that the carrier members of the several rotors are disposed symmetrically about the axis of said shaft.

5. An electrostatic machine as defined in claim 4 which comprises two rotors carried upon said shaft so that the carrier members thereof are displaced 90° from each other about the axis of said shaft.

6. An electrostatic machine as defined in claim 4 which comprises three rotors carried upon said shaft so that the carrier members thereof are displaced 120° from each other about the axis of said shaft.

7. An electrostatic machine as defined in claim 3 in which the several rotors and the inductor members associated therewith are arranged along said shaft, said rotors being carried upon said shaft so that the carrier members of the several rotors are in angularly spaced relation to each other about the axis of said shaft, said brushes being disposed in relation to the respective sectors of the respective rotors with which said brushes cooperate so that said given brush connected to said given terminal and associated with said given rotor establishes connection with a sector of said rotor substantially when connection of the given brush connected to said given terminal and associated with another rotor is disestablished from a sector of said other rotor.

8. An electrostatic machine as defined in claim 3 in which the several rotors and the inductor members associated therewith are arranged along said shaft, said rotors being carried upon said shaft so that the carrier members of the several rotors are disposed symmetrically about the axis of said shaft, said inductor members associated with the several rotors being disposed substantially in like positions about the axis of said shaft with respect to a fixed member of the machine, said given brushes which are connected to said given terminal of the machine being disposed substantially in alignment with each other in the direction parallel to the axis of the shaft and in a predetermined relation about said axis with respect to the inductor members associated with the respective rotors.

9. An electrostatic machine as defined in claim 8 in which said other brushes connected to said other terminal are disposed diametrically opposite said given brushes of the respective rotors.

10. An electrostatic machine as defined in claim 3 which comprises an auxiliary conductive inductor member associated with each rotor and arranged for movement of said carrier member of said rotor into inductive relation thereto concomitantly with movement of said carrier member out of inductive relation to said first inductor member associated with said rotor, and means for maintaining said first inductor member and said auxiliary inductor member associated with each rotor at different potentials respectively below and above the desired output potential.

11. An electrostatic machine comprising at least two primary conductive inductor members, conductive carrier members respectively associated with said inductor members and supported in continuous insulated relation thereto, said inductor members and said carrier members being arranged for relative movement in a predetermined path between the inductor members and the carrier members respectively associated therewith into and out of inductive relation to each other, an auxiliary conductive inductor member associated with each primary inductor member and its associated carrier member and supported in insulated relation thereto and to said carrier member, said auxiliary inductor member being disposed in spaced relation to said primary inductor member in the direction of relative movement in said path of said carrier member with respect to said primary inductor member associated therewith, said carrier members being movable in the respective paths into inductive relation to the respective auxiliary inductor members concomitantly with movement thereof out of inductive relation to said primary inductor members, means for maintaining each auxiliary inductor member at a potential higher than the potential of said primary inductor member and in a predetermined relation to the desired output potential of the machine, means for initially determining the potential of each movable carrier member at a point in said movement thereof at which said carrier member is at least in part in inductive relation to the primary inductor member associated therewith at a potential in a predetermined relation to the potential of said primary inductor member and to said output potential so as to produce a potential of said carrier member approximating the desired output potential during the movement of said carrier out of inductive relation to said primary inductor member, an output terminal of the machine, means for connecting each carrier member to said output terminal of the machine at a predetermined point in said movement thereof out of inductive relation to said primary inductor member and while at least in part in inductive relation to said auxiliary inductor member, and means for establishing said connection of a given carrier member to said output terminal concomitantly with disconnection of another carrier member from said output terminal to maintain substantially uniform the discharge to said terminal of the electrostatic charges carried by said carrier members.

12. An induction electrostatic machine comprising a stator formed of four conductive inductor members disposed symmetrically about an axis of rotation, a rotor rotatable on said axis and carrying five insulated conductive carrier members symmetrically disposed one following the other about said axis and extending about said axis through substantially equal angles, said carrier members being carried by said rotor adjacent said inductors so as to be electrically influenced in succession by said inductors upon rotation of said rotor, conductive sectors carried by said rotor in symmetrical disposition about said axis and respectively electrically connected to said carrier members and each having a circumferential extent about said axis approximating one-half that of the corresponding electrically connected carrier member, a pair of terminals for said machine, and two sets of brushes, each set having two brushes, the brushes of the respective sets being disposed at the respective ends of the two diagonals of a square concentric with said axis of rotation and for contact of each of said sectors with each brush in succession upon rotation of said rotor, one set of brushes being connected to one of the terminals of the machine and the other set being connected to the other terminal of the machine.

13. An induction electrostatic machine comprising an even number of conductive inductor members symmetrically disposed about an axis of rotation, a rotor rotatable on said axis and carrying an odd number of conductive carrier members continuously insulated from each other and from said inductor members during rotation of said rotor on said axis, said carrier members being symmetrically disposed about said axis outwardly with respect to said axis and having substantially the same extent of surface circumferentially about said axis, said carrier members being arranged for movement thereof in succession into and out of inductive relation to said inductor members upon rotation of said rotor, conductive sectors carried by said rotor in symmetrical disposition about said axis and respectively electrically connected to said carrier members, each of said sectors having an extent circumferentially about said axis equal substantially to the circumferential spacing between said sectors, an output terminal of said machine, at least one brush electrically connected to said output terminal and arranged for contact in succession with said sectors upon rotation of said rotor, and at least one other brush electrically connected to said output terminal and disposed in spaced relation about said axis of rotation with respect to said first brush and for contact in succession of said sectors therewith, said brushes being disposed with respect to each other in said spaced relation so that substantially upon said first brush respectively making and breaking contact with a given sector said second brush respectively breaks and makes contact with a sector circumferentially spaced with respect to said given sector.

14. An induction electrostatic machine as defined in claim 13 which comprises an even number of auxiliary conductive inductor members disposed in interspersed relation respectively to said first inductor members, means for maintaining said first inductor members at a predetermined potential less than the desired output potential of the machine, means for maintaining said auxiliary inductor members at a potential greater than said output potential of the machine, and means for initially determining the potential of said carrier members when respectively at least in part in inductive relation to said first inductor member at a potential intermediate between said potential of said first inductor member and the potential of said auxiliary inductor.

NOEL FELICI.

REFERENCES CITED

The following references are of record in the file of this patent:

UNITED STATES PATENTS

| Number | Name | Date |
| --- | --- | --- |
| 479,941 | Henry | Aug. 2, 1892 |